April 21, 1959 R. W. HUTTON 2,883,466

DIGIT-ABSORBING SELECTOR

Filed Aug. 4, 1954

3 Sheets-Sheet 1

FIG. 1, PART I, FIG. 2

April 21, 1959 R. W. HUTTON 2,883,466

DIGIT-ABSORBING SELECTOR

Filed Aug. 4, 1954 3 Sheets-Sheet 2

FIG. 1, PART 2

April 21, 1959 R. W. HUTTON 2,883,466

DIGIT-ABSORBING SELECTOR

Filed Aug. 4, 1954 3 Sheets-Sheet 3

United States Patent Office 2,883,466

Patented Apr. 21, 1959

2,883,466

DIGIT-ABSORBING SELECTOR

Robert W. Hutton, Chicago, Ill., assignor to International Telephone and Telegraph Corporation, a corporation of Maryland Application August 4, 1954, Serial No. 447,835

11 Claims. (Cl. 179—16)

This invention relates to a digit-absorbing selector suitable for use in an automatic telephone switching system. Its principal object is to provide a simple and economical selector which can readily be adapted to a large number of switching and numbering situations.

A further object is to provide apparatus which economically furnishes all of the commonly accepted digit-absorbing features in a selector system of the type wherein the switching apparatus which connects calling trunks to respective idle trunks in called groups is separate from, but is controlled by, digit-registers individual to the calling trunks. One selector system of the noted type is disclosed in the U.S. patent application of Hutton et al., Serial No. 359,761, now abandoned, filed June 5, 1953.

GENERAL DESCRIPTION

In an automatic telephone system using one or more selector stages, the normal practice is that a single digit dialed over a calling trunk incoming to a selector stage suffices to select a desired trunk group and to extend the calling trunk to an idle trunk in the selected group. In some situations digit absorption is employed at a selector stage, in that the selection of a trunk group and of an idle trunk therein occurs only upon the dialing of one or more additional digits over the noted calling trunk. Any such additional digits may be termed absorbed digits.

The more common reasons for employing digit absorption at a selector stage are:

(1) To nullify the initial digit 1 because of the prevalence of its simulation, from a defective station or line, for example;

(2) To increase the number of selectable trunk groups beyond ten, as in a combined local and outgoing selector stage;

(3) For one aspect of universal numbering, (*a*) to use up one or more extra digits assigned to lines of a small office or exchange to increase their numbers to the number of digits used for lines of standard-sized offices or exchanges, or (*b*) to use up locally unrequired digits assigned to special-service numbers as for information and long-distance; and (4) For a second aspect of universal numbering, to use up, on local calls, additional asssigned digits which may be required only for long-distance dialing.

A feature of the invention is that a single digit register is employed at any selector, and is restored and reoperated as required in the performance of any and all operations related to the handling of calls involving digit absorption.

A related feature is that the same digit-mark conductors controlled by the digit register to direct trunk-group selection are used to control digit absorption, the effect of placing a marking potential on any such conductor depending upon the point to which it is connected externally to the digit register.

A further feature is that the noted register-controlled digit wires are each provided with a normal branch and an alternate branch, with relay means responsive to the absorption of a digit of selected value for transferring each digit wire from its normal branch to its alternate branch, whereby a new set of marking conditions can be set up after the transfer. Such transfer is herein termed unlocking.

Other objects and features will appear hereinafter.

*The drawings*

Referring now to the drawings comprising Figs. 1 to 4, Fig. 1, parts 1 and 2 disclose a call-through diagram showing briefly the apparatus involved in extending a connection from a calling line to a called line through a selector 100;

Fig. 2 discloses a switching diagram of one of the typical applications of selector 100;

Figs. 3 and 3A disclose a second embodiment of the invention in which Fig. 3 discloses a switching diagram of another typical application of selector 100, and in which Fig. 3A, discloses a partial circuit diagram of selector 100, modified in accordance with such switching diagram; and Figs. 4 and 4A disclose a third embodiment of the invention in which Fig. 4, discloses a switching diagram of still another application of selector 100, and in which Fig. 4A, shows selector 100 modified in accordance with such switching diagram.

*General operation*

Referring to Fig. 1, parts 1 and 2 of the drawings, the general operation of the system in handling calls will now be described.

When the receiver (not shown) is removed at station S1 of line L1, the usual direct-current bridge is closed across the line conductors to operate the line circuit equipment LC–1 to cause operations to take place in line controller 600 (not shown) to operate line switch LS to extend a connection from the calling line to an idle selector, such as selector 100.

The idle or busy condition of selector 100 is indicated to line controller 600 by idle test conductor IT, in the manner described in the noted Hutton et al. application, the idle-test wire IT having battery potential thereon from current-limiting resistor 113, when selector 100 is idle.

Upon being found idle, selector 100 is seized and ground potential is returned over the sleeve conductor S to maintain the line circuit and the line switch operated to hold the connection between the calling line and the selector intact. Dial tone is thereafter returned to the calling line signalling the calling subscriber to start dialing the digits of the directory number of the desired party.

As will be described hereinafter, selector 100 may be arranged for a variety of switching applications and the digits dialed vary accordingly. Assuming the subscriber at station S1 on line L1 dialed the directory number of the subscriber S2 on line L2, operations occur in selector 100 and the associated selector controller 1300 to operate hundreds selector switch HSS to extend the calling connection to an idle connector 1600, from whence the connection is further extended through the connector switch and the line circuit of the called line to station S2 thereon.

Responsive to an extension of such a connection, the concerned connector 1600 applies ringing current to the calling line to signal the called station thereon.

The operation of hundreds selector switch HSS, selector controller 1300, connector 1600, connector switch CS, and connector controller 1700 is as described in the Hutton et al. application.

Responsive to called party answer, the calling and called parties may converse. The items of apparatus in the talking circuit include a line switch LS, a selector 100, a hundreds selector switch HSS, a connector 1600, a connector switch CS and the associated line circuit LC–2 of the called line.

Disconnect by the calling and called parties clears out the connection and all items of apparatus in the established connection are returned to normal use.

Referring now to Fig. 2 of the drawings, a switching diagram of a combined local and outgoing selector is shown. The selector 100 of Fig. 1, parts 1 and 2 is jumpered to provide the trunking arrangements indicated in Fig. 2.

Selector 100 is arranged to provide thirteen levels, three outgoing and ten local levels, the three outgoing levels comprise trunk groups to other offices and to a toll board. The toll board TB is reached by dialing an initial digit 0 or by dialing 110, the digit 1 being absorbed repeatedly as indicated by the symbol AR. When any digit is absorbed repeatedly, no switching operations occur and the selector is returned to its normal seized condition each time following the dialing of absorbed digits.

Likewise, the dialing of the initial digits 4 and 5 cause selector 100 to absorb such digits without any switching operations taking place.

It will be observed that level 3 is assigned symbol UL, which indicates such level corresponds to an absorbed digit which causes no switching operations to take place but which causes unlocking operations to occur in selector 100 which, if desired, renders the normally absorbed digits effective. Accordingly, the dialing of the digit 3 followed by the dialing of a normally absorbed digit such as the digit 1, renders the digit 1 an effective digit.

In the example shown in Fig. 2, the dialing of directory number 110 extends a connection from selector 100 to the operator at toll board TB, the initial digit 1 being absorbed both times it is dialed. Responsive to the dialing of the digit 0, a connection is extended over an operators trunk to the toll board. As will be described in detail hereinafter with reference to Fig. 1, the trunks to the toll board TB could be reached by dialing the initial digit 0. However, for the purpose of directory uniformity, three digits may be required to be dialed.

Selector 100 is arranged with two trunk groups extending to other offices, such trunk groups being assigned the level 9 and the level 7. Responsive to the dialing of the digit 9, an idle one of a group of trunks in level 9 is seized and the connection from the calling subscriber is extended to office 9. The level 9 trunks may be reached by dialing the single digit 9, or the absorbed digit 5 followed by the digit 9. Such condition may arise wherein it is desirable to reach an exchange by dialing two digits when local lines therein are desired or by dialing one digit when a suboffice is desired, the second digit indexing the suboffice. In this way standard numbering is retained. An example of such office will be described hereinafter with reference to Fig. 4 of the drawings.

The level 7 trunks may be reached by dialing a single digit 7, it being an active level to cause switching operations to take place responsive to such dialing.

In Fig. 2 of the drawings, the combined office and local hundreds selector 100 is indicated as arranged to serve ten local levels reached by dialing the digits 4, 5, and 3 followed by any thousands, hundreds, tens, and units digits. This arrangement provides a 7-digit ten-thousand number switching system. Under such arrangement, the first three digits 4, 5, and 3 are each absorbed, with the digit 3 performing an unlocking operation, whereby all ten levels are thereafter rendered effective.

DETAILED DESCRIPTION

Referring now to Fig. 1, parts 1 and 2 of the drawings, a detailed description of selector 100 will be given. This description will cover the operation of selector 100 in providing the trunk levels such as indicated in Fig. 2 of the drawings.

The twelve relays 101 to 112 of selector 100 have principal functions assigned thereto as follows:

Relay 101 (Cutoff) cuts off the line relay from the calling line to free the talking conductors on extended connections;

Relay 102 (Line) operates when selector 100 is seized and restores thereafter under control of the calling device or hookswitch, whenever the calling line loop is opened;

Relay 103 (Release) is slow-releasing by virtue of a copper sleeve under its winding; it is operated by the line relay; it remains operated during pulsing, but releases when the line relay remains restored for a substantial fraction of a second;

Relay 104 (Release auxiliary) is operated by the release relay and aids in the performance of the release relay functions;

Relay 105 (Series) is operated by the line relay; it operates at the beginning of the series of dial pulses and it restores only after the line relay has come to rest operated, as it is slow-releasing because of a copper sleeve under its winding;

Relay 106 (Off-normal) is operated on completion of the dialing of the first digit and remains operated thereafter until the selector is released;

Relay 107 (Busy) is operated from the selector controller to apply busy-tone signals to the calling line when all trunks in the called group are busy or when an unequipped trunk group is called;

Relay 108 (Chain) is operated on the completion of the dialing of certain digits of the directory number by seizing the chain of the selector section containing the calling selector for providing such selector the exclusive use of the selector controller 1300;

Relay 109 (Absorb repeatedly) is operated, when digits to be absorbed are dialed, to return the selector to its normal seized condition after the dialing of such digits;

Relays 110 and 111 (Unlock) are operated responsive to the dialing of any unlocking digit; and Relay 112 (Switching) is operated when an unlocking digit is dialed, to switch the ten first-digit group wires to the ten second-digit group wires, to thereby increase the number of levels outgoing from the selector.

The digit register DR registers the number of impulses in the dialed digits; at its break contacts 1 it removes idle-indicating battery from the sleeve as a guarding measure; at its make contacts 1 it completes an operate circuit for the chain relay when required; and at its contacts 2 to 10 control the selection of the group wires according to the dialed digits.

*Detailed operation*

A detailed operation of selector 100, arranged to provide trunking as indicated in Fig. 2 of the drawings, will now be given.

When selector 100 is seized by the appearance of battery potential projected ahead on the tip conductor T of the originating trunk, as described in the noted Hutton et al. application, the ground-connected upper winding of relay 102 is energized. Line relay 102 operates and at its make contacts extends ground potential to the battery-connected winding of release relay 103. Release relay 103 operates and at its make contacts 1 extends ground potential rearwardly on the sleeve conductor S to maintain the switching apparatus operated to hold the connection intact; its contacts 2 extend ground potential to the battery-connected winding of auxiliary release relay 104; and its make contacts 3 ground common locking wire 122.

Release auxiliary relay 104 operates and at its make contacts 1 extends dial tone from the dial-tone lead DT through break contacts 1 of off-normal relay 106, break contacts 1 of busy relay 107, and through tone-coupling condenser 115 to the tip conductor of the calling line through break contacts 1 of cutoff relay 101; its contacts 3 connect the select magnet control wire SM to make contacts 2 of chain relay 108 preparatory to operating the select magnet associated with selector 100; its make contacts 4 prepare an operate circuit for series relay 105 and register DR; and its break contacts 2 open the idle-indicating battery supply from the idle test conductor IT to prevent selector 100 from being taken for use on any other call.

On hearing the noted dial-tone signal, the calling subscriber at station S1 on line L1 dials the desired digits of the called number.

Each time the calling device (not shown) is operated to transmit a series of circuit interruption impulses, line relay 102 is restored momentarily for each such interruption impulse in a series, comprising from one to ten impulses, depending upon the digit dialed. Release relay 103 remains operated throughout any series of line relay restorations, it being slow-restoring because of its indicated copper sleeve and relatively light spring load.

Series relay 105 operates promptly upon the first restoration of line relay 102, its operate circuit being from break contacts on the line relay and make contacts 4 of auxiliary relay 104. Being slow-restoring because of the indicated copper sleeve, series relay 105 remains operated throughout the digit series of momentary restorations of the line relay.

Contacts on series relay 105 operate off-normal relay 106 which at its contacts 1 removes dial tone from the calling subscriber line; at its contacts 2 opens another point in the idle-test battery supply current; locks operated at its contacts 3; at its contacts 4 prepares a clear-out circuit; and at its contacts 5 connects wire 119 to wire 124 in preparation for marking the selected digit.

With release relays 103 and 104 maintained operated continuously, ground from back contacts of line relay 102 is extended through make contacts 4 of auxiliary release relay 104 to the battery-connected winding of series relay 105, as noted, and to pulse wire 120 through break contacts 2 of busy relay 107 and break contacts 4 of cutoff relay 101. Each restoration of line relay 102 therefore delivers an impulse to pulse wire 120, connected to the lower or operating winding of digit register DR, thereby operating it in accordance with the value of the dialed digit, as will be described.

When impulses of the dialed digit are delivered over wire 120 to the operate winding of digit register DR, the contact sets 1 to 10 of this register are actuated successively, responsive respectively to the impulses of the digit.

On receipt of the first impulse, digit register DR, at its break contacts 1 disconnects the idle-indicating battery potential from the idle-test conductor IT, and at its make contacts 1 completes an operate circuit for the chain relay.

When line relay 102 comes to rest operated at the end of any digit series of impulses, series relay 105 shortly thereafter restores, responsive to the continued open-circuit of its operate circuit, and at its break contacts closes the chain operate circuit, this circuit including break contacts 4 of busy relay 107, wire 124, break contacts 3 of unlock relay 110, wire 123, make contacts on the digit register DR, and break contacts 1 of absorb-repeatedly relay 109.

Selector 100 is provided with jumper boards JB-116 and JB-117 for controlling the digit group wires G1 to G14 extending to selector controller 1300 over conductors in cable group 280.

Jumper board JB-116 is associated with input wires IN-1 to IN-10 and output wires OUT-1 to OUT-10, which are interconnected by operation of the digit register DR. Jumpers, such as jumper 292, are connected between the input wires and common wires 118 and 119 depending upon the function assigned the digit corresponding to the jumpers. For example, all digits assigned for initial digit switching operations, are connected to wire 118 which becomes energized responsive to the operation of the chain relay. The digits which are assigned for absorption, excepting the initial digit 1, are jumpered to common wire 119, which becomes energized responsive to the end of the dialing of each digit.

When properly jumpered, the dialing of a digit assigned an active level causes the corresponding input wire to be energized only at such time that the concerned selector is individualized with controller 1300. Such digit wires are connected to common wire 118.

When a digit is dialed which is to be absorbed and is not normally connected to the common group wires G1 to G14, the associated input wires may become energized before controller individualization, in order to speed up selector operation. Such digit wires are connected to common wire 119.

An exception to the above is the jumpering of the digit 1 wire to common wire 118, even though it is absorbed. Such jumpering of the digit 1 wire to wire 118 instead of 119 is required as the digit 1 wire is not controlled by make contacts on register DR and following the dialing of any digit, it would become grounded if connected to wire 118.

Referring now to jumper board JB-117, it will be observed that there are two groups of digit wires, groups A and B, each comprising ten wires. Wires A1 to A10 are normally connected to output wires OUT-1 to OUT-10 while wires B1 to B10 are connected thereto by operation of switch relay 112. If an initial digit is to be absorbed repeatedly, the corresponding A wire is connected to wire AR; if the initial digit is an unlocking digit, the corresponding A wire is connected to wire UL; and if any digit is to be effective after the dialing of an unlocking digit, the corresponding B wires are connected to the desired group wires G1 to G14.

*Digit 1 absorption*

When the digit 1 is dialed before the unlocking digit is dialed, in this case the digit 3, the digit 1 is absorbed each time it is dialed.

Responsive to the dialing of the initial digit 1, the first contact set is the only one operated on the digit register DR. Then, when series relay 105 restores, at the end of the dialing of each digit, ground potential from back contacts thereof is extended through break contacts 4 of busy relay 107 and break contacts 6 of cutoff relay 101 to wire 124 as described. The ground on wire 124 is extended through make contacts 5 of off-normal relay 106, which operated responsive to the operation of the series relay 105, and through break contacts 4 of unlock relay 111 to wire 119. The ground on wire 124 is also extended through break contacts 3 of unlock relay 110 to wire 123 from whence it is extended through closed contacts 1 of digit register DR and through break contacts 1 of absorb-repeatedly relay 109 to one side of the chain relay 108. If a battery-supply circuit is complete to the chain-in wire from break contacts 5 of the preceding selector units, such battery potential is extended through break contacts 5 of chain relay 108 and break contacts 4 thereof to the other side of the winding of chain relay 108. This path includes the chain-in conductor closed in the idle selector controller and the closed chain-out conductor when no other selector in the selector section is individualized to the controller, the complete chain circuit being as described in the noted Hutton et al. application.

Chain relay 108 is operated over the traced circuit to seize the common chain circuit and common equipment and to guard it against seizure by any other selector in the same section by locking itself at its make-first contacts 4 to the associated chain-in wire and by isolating the chain-out from the chain-in wire of the next selector at its break contacts 4 and 5.

Chain relay 108 at its make contacts 6, grounds wire 118 extending to jumper board JB-116 in addition to performing its other functions hereinafter described.

Ground potential on wire 118 is extended over a jumper 292 on jumper board JB–116 to the first input wire IN–1 from whence it is extended through unoperated contacts 2 of digit register DR to output wire OUT–1 extending to contacts on switch relay 112, from whence it is further extended to output wire A1 of jumper board JB–117.

As hereinbefore noted, with any digit being assigned for repeated absorption, the corresponding digit wire of the A group is connected to the absorb-repeatedly conductor AR. Accordingly, the ground appearing on the output wire A1 is extended to absorb-repeatedly wire AR by jumper 1–14 and appears on one side of the battery-connected winding of absorb-repeatedly relay 109.

Absorb-repeatedly relay 109 operates and locks through its make contacts 1 to the ground appearing on wire 123 and at the same time opens the operate circuit of chain relay 108. Make contacts 2 of relay 109 extend ground potential to wire 125 through break contacts 5 of cut-off relay 101. This ground is extended to wire 121 extending to the upper or knockdown winding of the digit register DR through current-limiting resistor 114.

Chain relay 108 restores; the common equipment is returned to common use; and ground is removed from wire 118.

The current flow through the upper winding or knockdown winding of digit register DR neutralizes the residual holding flux in the digit register DR, consequently restoring it. When digit register DR restores, its contacts 1 open the locking circuit of absorb-repeatedly relay 109, permitting it to release.

When the AR relay 109 restores, its contacts 1 again close the operate circuit of chain relay 108 and its make contacts 2 remove ground from the knockdown winding of the digit register. The selector is then returned to its normal seized condition excepting that relay 106 is now locked operated to prevent reapplication of dial tone.

If the digit 1 is dialed again as the second digit, the described sequence of operations above described again take place.

*Initial digit 4 absorption*

If the digit 4 is dialed before the dialing of the unlocking digit 3, the digit register DR responds to the ground impulses appearing on wire 120 and actuates its contacts 1 to 4 in response to such impulses.

When series relay 105 restores, the ground potential appearing on wire 124 is extended through break contacts 5 of operated off-normal relay 106 to wire 119 through break contacts 4 of unlock relay 111, and is also extended through the break contacts 3 of unlock relay 110 to wire 123 extending to one side of the winding of chain relay 108, as hereinbefore described.

The ground appearing on wire 119 is extended through a jumper 292 to input wire IN–4, corresponding to the digit 4, from whence it is extended through break contacts 5 and make contacts 4 of register DR to output wire A4 of jumper board JB–117 through break contacts on relay 112.

As described with reference to the dialing of the digit 1, ground appearing on the jumper 1–14 is extended to the absorb-repeatedly wire AR to operate relay 109 in the manner hereinbefore described.

At the time that the AR relay 109 operates, chain relay 108 attempts to operate if the associated chain is idle. However, the operation of relay 109 opens the operate circuit of chain 108 preventing its operation, or restoring it if it is already operated.

Responsive to the operation of the absorb-repeatedly relay 109, digit register DR is released by the appearance of ground on the knockdown wire 121, as noted. The selector is now returned to its normal seized condition.

*Digit 5 absorption*

Assuming the digit 5 to be dialed before the unlocking digit 3 is dialed, the hereinbefore described operations take place to ground output wire A5 of jumper board JB–117. This ground is extended to the absorb-repeatedly wire AR and operations then occur to absorb such digit and return the selector to its seized condition, in the manner described for initial digits 1 and 4.

*Unlocking operation*

Assuming that the digit 3 is dialed, ground impulses appearing on pulse wire 120 cause digit register DR to activate its contact sets 1 to 3 in succession. When series relay 105 thereafter restores on completion of the dialing, the ground appearing on wire 124 is extended through make contacts 5 of relay 106 and break contacts 4 of relay 111 to wire 119 from whence it is extended by a jumper 292 to input wire IN–3. The ground on the input wire IN–3 is extended through break contacts 4 and make contacts 3 of digit register DR and through break contacts on switch relay 112 to output wire A3.

As hereinbefore noted, since digit 3 is to be absorbed and unlocked, a jumper such as jumper 1–15 is connected which extends the ground appearing on output wire A3 to the unlocking wire UL. This ground appearing on wire UL is extended to the battery-connected winding of unlock relay 110 which operates and at its make contacts 1 prepares the locking circuit therefor; at its make contacts 2 prepares to restore the digit register; and at its break contacts 3 open the operate circuit of chain relay 108 to control it in a manner similar to that described for contacts 1 of relay 109.

Ground appears on wire 125 from make contacts 2 of relay 110 and break contacts 2 of relay 111 and is extended to the upper or knockdown winding of digit register DR through break contacts 5 of relay 101 and current-limiting resistor 114. Digit register DR restores and removes ground potential from the unlocking wire UL.

Responsive to the removal of ground from the unlocking wire UL, relay 111 operates in series with relay 110 to the ground appearing on locking conductor 122.

Make contacts 1 of unlock relay 111 extend ground potential to the battery-connected winding of switch relay 112; break contacts 2 remove the ground from the knockdown winding of the digit register; make contacts 3 prepare an operate circuit for the chain relay 108 responsive to the dialing of the next succeeding digit; and make contacts 4 connect wire 118 to wire 119.

Switch relay 112 operates and at its contacts 1 to 10 transfers output wires A1 to A10 to the output wires B1 to B10 thereby cancelling the effectiveness of jumpers 1–14 and 1–15, and rendering jumpers 1–1 to 1–10 effective.

*Dialing after unlocking*

Assuming any digit to be dialed following the dialing of the unlocking digit 3 and the consequent operation of switch relay 112, the digit register DR actuates its contact sets 1 to 10 successively, responsive respectively, to the impulses of the digit dialed.

Following the completion of the dialing of the digit after unlocking operation, series relay 105 restores and grounds wire 124, as noted. This ground is extended to the one side of the winding of chain relay 108 through contacts on the digit register and relay 109, operating relay 108.

With wire 119 disassociated from wire 124, ground does not appear on any of the input wires of register DR until wire 118 becomes grounded by operation of the chain relay.

Chain relay 108 operates as hereinbefore noted and at its make contacts 6 grounds wires 118 and 119 extending to jumper board JB–116. The ground appearing on wires 118 and 119 is extended over jumpers 292 to the input wire corresponding to the digit dialed and is further extended through make contacts on the switching relay 112 to the corresponding one of the output wires in the B group. With the wires B1 to B10 connected as illustrated, ground on the selected output wire is extended over a jumper 1–1 to 1–10 to the concerned one of group wires G1 to G10, extending to selector controller 1300 over conductors in cable 280.

Assuming the digit 5 is dialed, ground appears on output wire B5 and is extended over jumper 1–5 to group wire G5 to cause operations to take place in selector controller 1300 to operate the hundreds selector switch to extend the connection to an idle one of the trunks in the group corresponding to the called digit 5.

Make contacts 1 of chain relay 108 connect the sleeve conductor S of the forward connection to the battery-connected winding of cutoff relay 101; make contacts 2 ground select magnet wire SM through make contacts 3 of relay 104; make contacts 3 prepare an operate circuit for busy relay 107 in the event that all trunks in the called group 5 are busy or if the called trunk group is an unequipped group; make contacts 4 and 5 lock the chain relay operated and individualizes it with the common controller as noted; and make contacts 7 connect the HB battery wire to the HB conductor to start the selector controller into its controlling operation, described in the Hutton et al application.

Cutoff relay 101 operates from the ground appearing on the sleeve conductor when an idle trunk in the called group is seized; its break contacts 1 and 2 disconnect line relay 102 from the calling conductors; its make contacts 3 connect the forward extension of the sleeve to the rearward extension; its break contacts 4 open the operate circuit of the digit register; its break contacts 5 open the release circuit of the digit register DR; and its break contacts 6 open the operate circuit of the chain relay 108.

Chain relay 108 restores and at its make contacts 1 places the locking of the cutoff relay 101 in series with the upper winding of off-normal relay 106 to the sleeve conductor, and at its other contacts returns selector controller 1300 to common use again. The connection from the calling station S1 on line L1 is now extended through selector 100 to an idle trunk in the called trunk group 5, such group being assigned numbering code 453–5, which could be considered a portion of a directory number such as GL–3 5XXX.

At such time, line relay 102 restores and restores relays 103 and 104. Responsive to the restoration of relay 103, unlock relays 110 and 111 restore, in turn restoring switch relay 112. At such time, the cutoff relay 101, off-normal relay 106, and digit register DR are the only items of apparatus in selector 100 that are operated. Selector 100 is maintained in a seized condition from ground on the sleeve conductor S from the next succeeding item of equipment.

The calling subscriber at station S1 on line L1 dials the remaining digits of the desired number to extend the connection to a desired subscriber, such as subscriber S2 on line L2.

*Clearout*

Responsive to disconnect by the calling and called lines, ground potential disappears from the sleeve conductor S restoring cutoff relay 101 and off-normal relay 106, relay 106 being slow-restoring because of the indicated copper sleeve under its winding. At a time when off-normal relay 106 is yet operated and cutoff relay 101 is restored, ground potential from back contacts of line relay 102 is extended through break contacts 4 of auxiliary release relay 104, make contacts 4 of the operated off-normal relay 106, and break contacts 5 of cutoff relay 101 to wire 125 extending to the upper or knockdown winding of digit register DR.

Digit register DR thereupon restores and a short time later, off-normal relay 106 restores, completely clearing out selector 100. Selector 100 is now prepared to receive another call.

*Unequipped levels*

Assuming the digit to be dialed in selector 100 to correspond to an unequipped level, responsive to the operation of chain relay 108 following the restoration of series relay 105 on the completion of the dialing of such digit, selector controller 1300 is seized in preparation for extending the connection. In the event an unequipped level is dialed, such as level 2, no ground is forthcoming on the group wires G1 to G14 as no corresponding jumper is connected from output wire A2 on jumper board JB–117. Selector controller 1300, as described in the noted Hutton et al. application, after a slight delay, extends ground potential on a busy conductor BU which is connected to the battery-connected winding of busy relay 107 through make contacts 3 of chain relay 108.

Busy relay 107 operates and at its make contacts 1 extends trunk busy tone TBT through tone-coupling condenser 115 to the tip conductor of the calling line, thereby signalling the subscriber thereon that an unequipped level has been dialed. Break contacts 2 of busy relay 107 open the operate circuit of digit register DR in the event that more dialing should occur; at its make contacts 3, it locks operated to the ground on conductor 122; and at its break contacts 4, opens the operate circuit of chain relay 109, causing it to restore.

Responsive to the restoration of chain relay 108, selector controller 1300 is returned to common use and the busy tone signal is returned to the calling subscriber independently of the common equipment.

Following disconnect by the calling line upon receipt of busy tone, selector 100 is returned to normal use.

In the event all trunks in a called level are busy, as noted in the Hutton et al. application, selector controller 1300 grounds the common busy wire BU to cause the busy relay 107 to operate and release the common equipment as described for dialing an unequipped level.

*Operator calls*

Responsive to the dialing of directory number 110, a connection is extended to the operator at toll board TB. The digit 1 is absorbed both times it is dialed as hereinbefore described. The dialing of the digit 0 thereafter causes register DR to actuate its contacts 1 to 10. Upon completion of the dialing of the digit 0, series relay 105 restores and extends ground potential to wire 123 extending to the one side of the winding of chain relay 108 and to wire 119 through make contacts 5 of release relay 106.

Since the initial digit 0 is assigned an active level, the grounding of the input wire corresponding to such digit must be delayed until chain relay 108 operates, and accordingly is not jumpered to wire 119. Thereafter, following the operation of chain relay 108 as hereinbefore described, make contacts 6 thereon ground conductor 118 which is connected to input wire 10 by a jumper 292. This ground is further extended through make contacts 10 of digit register DR to output wire A10 extending to group wire G13 over jumper 1–13 of jumper board JB–117.

In the manner described in the noted Hutton et al application, ground appearing on one of the group wires causes operations to take place in the selector controller to direct the call thereto. In this disclosure the digit 0 is assumed to direct the operation of selector controller 1300 to cause hundreds selector switch HSS to extend the connection to an idle trunk such as 193 or 194 which may be assumed to extend to a toll operator at a toll board TB.

Responsive to the operation of the selector controller 1300 in responding to a called lever, ground appears on the sleeve conductor S to operate the cutoff relay in the manner hereinbefore described to complete the connection from the calling line to the toll operator.

*Level 9 or 59 called*

Responsive to the calling of the level 9 by the dialing of the initial digit 9 or the calling of level 59 by the dialing of the initial digit 5 followed by the digit 9, operations occur to extend the connection to an idle trunk in the called group.

If a single digit 9 is dialed, register DR and associated jumper, connect wire 118 to output wire A9 in a manner hereinbefore described to cause operations to take place in selector controller 1300 to extend the calling connection to an idle trunk in the called group.

If the digit 9 is preceded by a digit 5, the digit 5 is absorbed, returning the selector to normal seized condition, and the dialing of the digit 9 thereafter is as above described.

Such an arrangement permits the level 9 to be reached by a single digit 9 or a two-digit number 59. The two digits 59 are normally dialed unless the office associated therewith is a tandem office and an additional digit must be dialed therein. This arrangement provides numbering uniformity, an example of such being described hereinafter with reference to another embodiment of the invention.

*Level 7 calls*

The operation of selector 100 in responding to the initial digit 7 is similar to that described for the dialing of the initial digit 9, as ground appears on output wire A7 from whence it is extended to group wire G11 over jumper 1–11 to control selector controller 1300.

*Local calls*

In the event that the local subscriber at station S1 on line L1 desires to call a subscriber in the local exchange, the directory number of such line, comprising seven digits as indicated in Fig. 2, is dialed. Selector 100 responds to the first four digits of such number to direct the call to the hundreds group of lines served thereby, such operation being as follows.

Responsive to the dialing of the initial digit 4, register DR is actuated and ground potential appears on the absorb-repeatedly jumper 1–14 as hereinbefore described and register DR is thereafter restored. The dialing of the second digit (digit 5) of the subscriber's directory number is likewise absorbed and register DR is operated and thereafter restored to absorb such digit.

The dialing of the third digit (digit 3) causes operations to occur to operate switch relay 112 in the manner hereinbefore described and to thereafter return the register to its normal unoperated condition.

Responsive to the dialing of the thousands digit following the dialing of the office code GL–3 (453), digit register DR operates and operations occur as hereinbefore described to ground the selected one of the group wires G1 to G10 from ground from contacts 6 of chain relay 108 appearing on the concerned one of the jumpers 1–1 to 1–10 of jumper board JB–117.

Selector controller 1300 responds to control over the corresponding conductor in cable group 280 to cause operations to occur to extend the connection from the calling line to connector 1600 through hundreds selector switch HSS.

The remaining three digits of the desired subscriber's directory number are thereafter dialed and operations occur in connector 1600, as described in the noted Hutton et al. application, to further extend the connection to the called station S2 on line L2.

Responsive to disconnect by the calling and called subscribers, all items of apparatus included in the talking path are restored and selector 100 is cleared out as described.

In the foregoing description, all levels after unlocking operation are described as being active levels. It is apparent that any level reached after unlocking operation could be unequipped or assigned as a special service level, such as intercept, code call, and the like.

SECOND EMBODIMENT

Referring now to Figs. 3 and 3A of the drawings, a second embodiment of the invention will be described.

Fig. 3 shows a switching diagram of selector 300 in a selector stage of a small office of 1000 lines having 7-digit directory numbers assigned thereto.

Special service trunks to the toll operator are reached by dialing three digits, such number of digits maintaining numbering uniformity with other exchanges.

Figure 1:
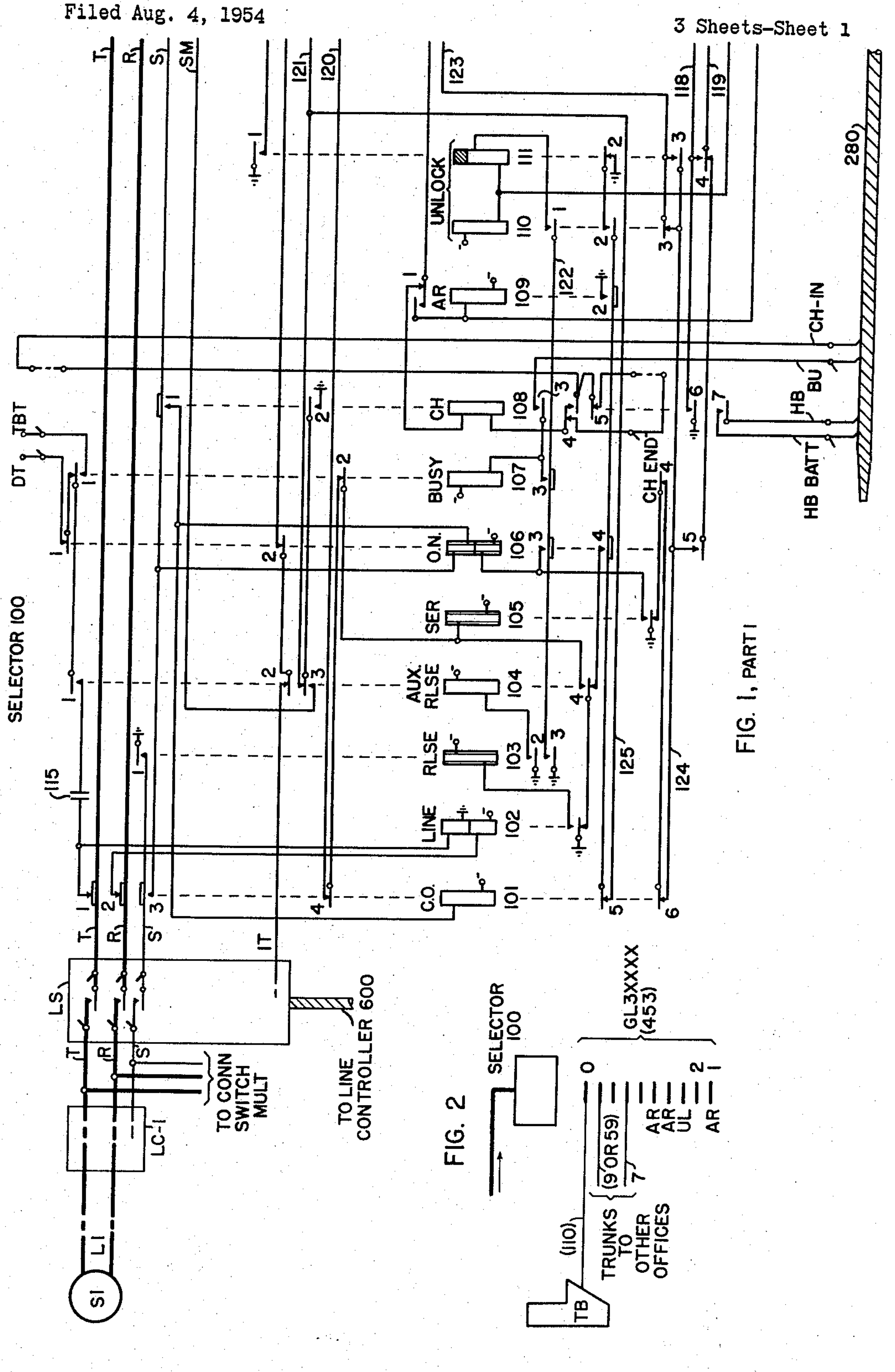
Figure 2:
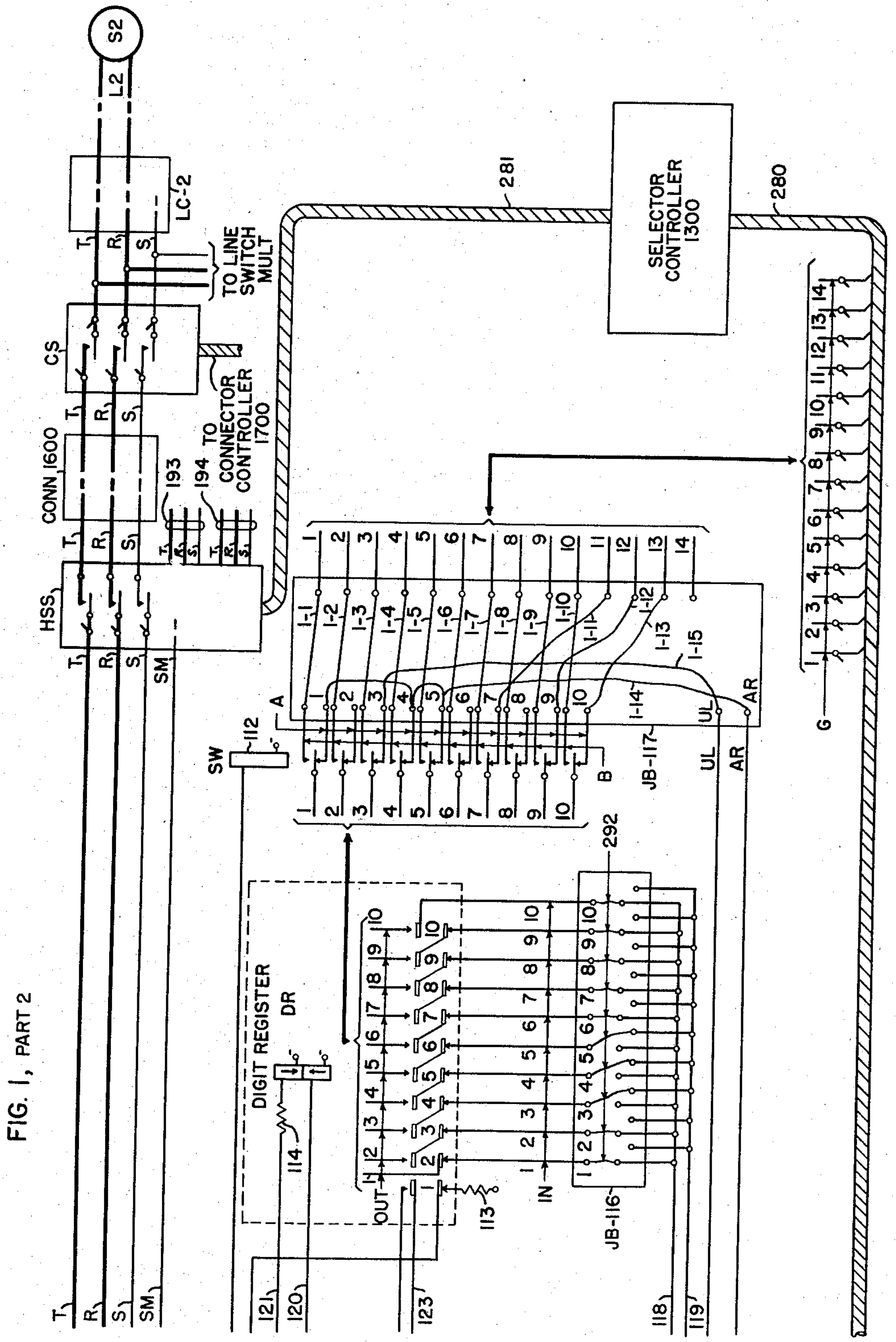
Figures 3, 3A:
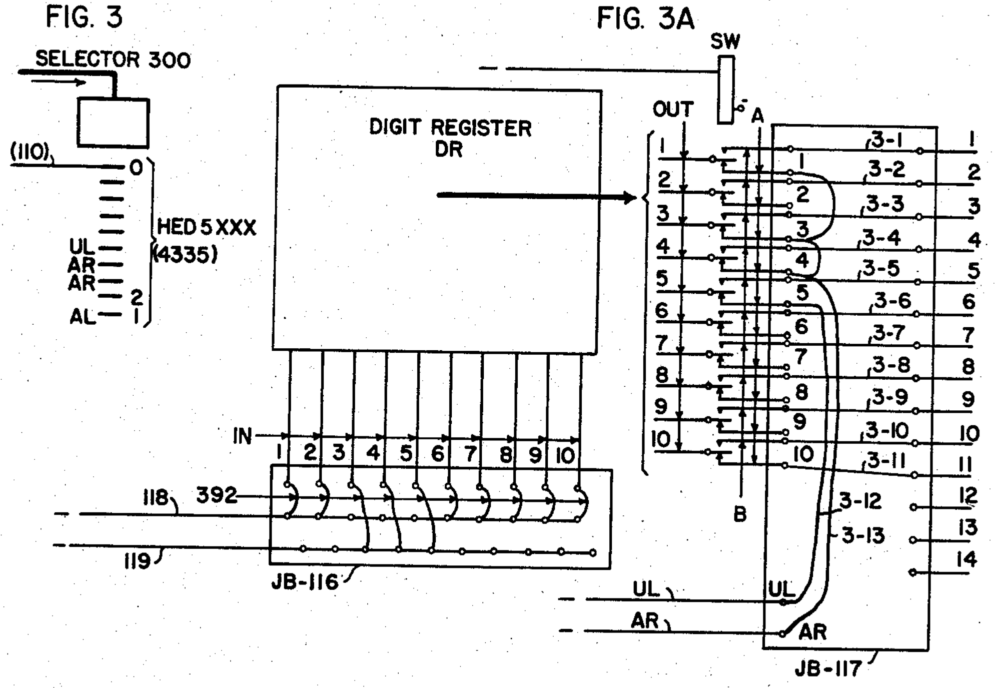
Figs. 3 and 3A illustrate one arrangement for absorbing one or more of the extra digits assigned to lines of a small office, wherein the number of digits assigned such lines are in conformity with standard-sized offices and exchanges.

In Fig. 3A, selector 300 is shown in partial circuit diagram, the omitted portions being assumed similar to selector 100 of Fig. 1.

On jumper board JB–117, jumpers 3–1 to 3–10 are assigned group wires G1 to G10, jumper 3–11 is assigned group wire G11, and jumpers 3–12 and 3–13 are assigned for digit-absorption operation.

Jumpers 392 on jumper board JB–116 are connected in accordance with the functions assigned their respective digits, as noted for jumpers 292 for Fig. 1, part 2.

Digit 1 of selector 300 is assigned for repeated absorption by the connecting of a jumper 392 between the corresponding input wire IN–1 and the control wire 118, such control wire being grounded responsive to the operation of the chin relay to prevent false marking as hereinbefore indicated. Digits 3, 4, and 5 are assigned as absorption digits by jumpers 392 connecting the associated input wires to wire 119, digit 5 being the unlocking digit as indicated by jumper 3–12 connected to unlocking wire UL, and digits 3 and 4 being repeatedly absorbed until unlocking operation has taken place, as indicated by jumper 3–12 being connected to the absorb-repeatedly wire AR.

*Local calls*

In view of the foregoing description of the first embodiment, it can readily be seen that responsive to the dialing of the digit 1, ground appears on conductor 118 and is extended through a jumper 392 of jumper board JB–116 and jumpers 3–12 of jumper board JB–117 to the absorb-repeatedly wire AR to cause the digit 1 to be absorbed each time it is dialed. Likewise, responsive to the dialing of digits 3 or 4, ground appears on wire 119 and is extended to the absorb-repeatedly conductor AR to cause such digits to be absorbed each time they are dialed, until the unlocking digit is dialed.

In the event the digit 5 is dialed, it being assigned as an unlocking digit, ground on wire 119 is extended over jumper 392 and jumper 3–12 in the manner similar to the jumpering of the unlocking digit 3 of Fig. 1, and similar operations occur to render all digit levels active thereafter by operation of the switching relay.

Responsive to the dialing of the office code HED–5, all group wires G1 to G10 are thereafter rendered effective. The first digit, digit 4 (letter H), the second and third digits (letters E and D) are absorbed. Responsive to the dialing of the unlocking digit 5, the switching relay operates to connect the group wires G1 to G10 to the output wires of digit register DR so that in the event that any digit is thereafter dialed, such digit causes operations to occur to extend a connection to an idle trunk in the called group.

*Special-service calls*

Responsive to the dialing of the special-service number 110, digit 1 is absorbed both times it is dialed and the digit 0 causes ground to appear on the G11 wire from jumper 311 to cause operations to occur to extend the connection over an idle trunk to the toll operator, in a manner previously described.

THIRD EMBODIMENT

Figures 4, 4A:
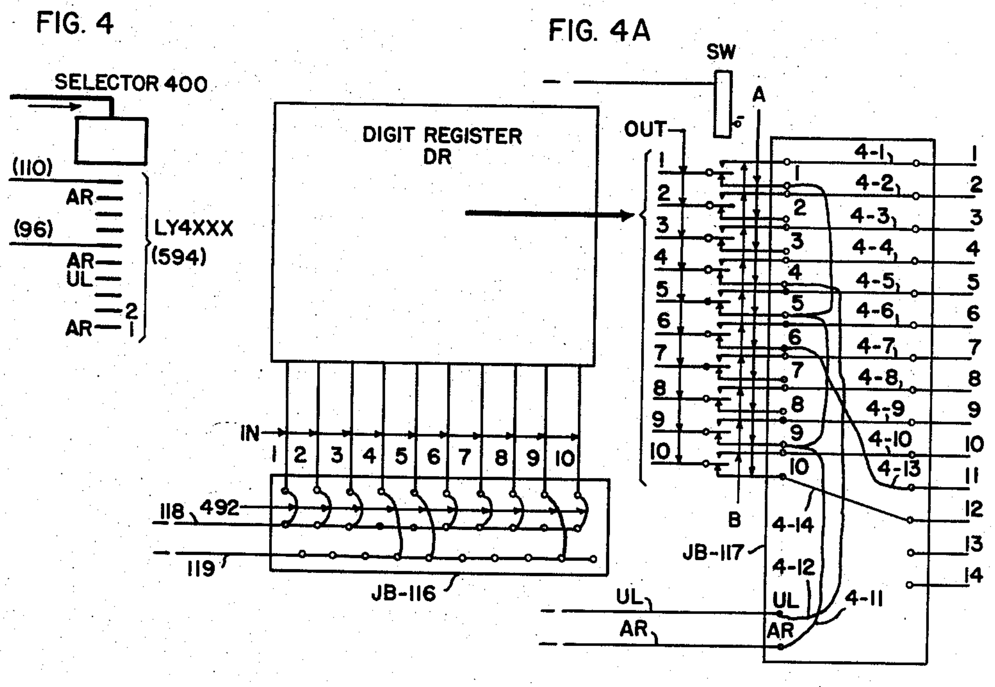

Referring now to Figs. 4 and 4A of the drawings, a third embodiment of the invention will be shown in order to illustrate another advantage of the digit-absorbing selector unit.

Selector 400 indicated in Fig. 4 may be a combined outgoing and local tandem office selector having an outgoing trunk group 6 which is reached by dialing the digits 96 or the digit 6. Selector 400 is arranged for use in a small office of 1000 lines with the directory number of such lines containing six digits.

For local calls, selector 400 is arranged for use in a 6-digit 1000-number system in which the office code LY–4 (594) when followed by the dialing of a hundreds, tens, and units digit extends a connection to any desired subscriber therein.

As indicated in Fig. 4A, digits 1, 5, and 9 are absorbed repeatedly while digit 4 performs unlocking operations.

Referring now to Fig. 4A, selector 400 is shown in partial circuit diagram, the omitted portion assuming to be similar to selector 100 of Fig. 1. As pointed out for selector 100, the digits to be absorbed repeatedly and to perform unlocking operations have the corresponding input wires jumpered to control wire 119 with the exception of digit 1 which is assigned to wire 118 to prevent false grounding of digit wires upon the dialing of any absorbed digit, as previously noted.

Jumper board JB–117 is shown with jumpers 4–1 to 4–13 connected to provide the trunking as indicated in Fig. 4A. Jumpers 4–1 to 4–10 are connected to respective group wires G1 to G10; jumper 4–11 connects wires A1, A5, and A9, corresponding to digits 1, 5, and 9, to the absorb-repeatedly wire AR; jumper 4–12 connects wire A4, associated with the digit 4, to the unlocking conductor UL; jumper 4–13 connects the wire A6, corresponding to initial digit 6, to group wire G11; and jumper 4–14 connects wires A0, corresponding to initial digit 0, to group wire G12.

*Special-service calls*

Responsive to the dialing of the directory number 110, digit 1 is absorbed both times it is dialed and the digit 0 causes the ground appearing on conductor 118 to be extended through contacts on the digit register DR and on the switching relay to jumper 4–14 extending to group wire G12 to cause operations to occur to extend a connection to the toll operator.

*Outgoing trunk calls*

The office containing selector 400 may be a tandem office for calls to a suboffice served by trunks in level 6. Incoming calls to selector 400 may be further extended to the suboffice by the dialing of the single digit 6 in selector 400 or calls from local subscribers to the suboffice may reach trunks extending thereto by the dialing of the digits 96.

If used as a tandem office, responsive to the dialing of the digit 6 (the digit 9 being dialed in the calling office), ground from wire 118 is extended through register DR and contacts on the switching relay to group wire G11 over jumper 4–13. The selector controller (Fig. 1, part 2) thereupon extends the connection to an idle trunk in the called group. If a local subscriber desires the suboffice, the digits 96 are dialed in order to conform to uniform numbering. The digit 9 upon being dialed, causes ground to appear on the absorb-repeatedly wire AR from its associated jumper 4–11 and associated jumper 492. As hereinbefore described with respect to calling an absorbed digit, no switching operations occur and the selector awaits the next digit. The dialing of the digit 6 thereafter causes ground to appear on jumper 4–13 extending to group wire G11 to cause such selector controller to extend the connection to an idle trunk in the group extending to a suboffice 96.

*Local calls*

Responsive to the dialing of the office code LY–4, the digit 5, corresponding to the letter L, and the digit 9 (letter Y) are absorbed repeatedly by the appearance of ground on absorb-repeatedly wire AR from jumper 4–11 in the manner hereinbefore described to cause absorbing operations to occur. The dialing of the digit 4 causes ground to appear on jumper 4–12 which causes the hereinbefore described unlocking operations to occur to render levels 1 to 0 active for the dialing of any digit thereafter.

The dialing of any digit following the dialing of the unlocking digit 4, causes ground to appear on the associated one of the group wires to cause operations to occur in the selector controller to extend a connection over an idle trunk in the called group.

While only several typical examples of digit-absorbing selectors are shown, it can readily be seen that many variations are possible with the digit-absorbing arrangement provided.

I claim:

1. In a multi-stage switching system, a selector terminating a trunk incoming to a selector stage which has numerical groups of trunks outgoing therefrom, the selector including a digit register individual to said incoming trunk and operable to record the value of any digit called thereover, the selector including means for restoring the digit register for reoperation to permit it to record the value of each of a number of successive digits, marking means controlled by the digit register for marking any numerical group of trunks corresponding to a selected value of a called digit, automatic switching apparatus and means for operating it responsive to the said marking of any numerical group for selecting an idle trunk therein and for connecting the said incoming trunk thereto, absorb-repeatedly means in the selector for operating the restoring means of the digit register responsive to the recordation of any one of a plurality of values of an indefinite succession of digits commencing with the first digit without effectively marking any trunk group, the last said means enabling any value of the said succession of digits to be included in the said plurality of values.

2. In a multi-stage switching system according to claim 1, means included in the said marking means for marking a desired numerical group of trunks responsive to the recordation of any selected value of any desired digit of the said succession of digits.

3. In a multi-stage switching system according to claim 1, the said selector including unlocking means and means for operating it responsive to the recordation of any selected value of any desired digit of the said succession of digits, the last said means including means for operating the restoring means of the digit register in preparation for the recordation of the next succeeding digit, and means controlled by the unlocking means for enabling the digit register to mark any desired numerical group of trunks responsive to the recordation of its corresponding value of a succeeding group-marking digit irrespective of the result of the recordation of any digit of that value prior to the operation of the unlocking means.

4. In a multi-stage switching system according to claim 3, further means controlled by the unlocking means for enabling any desired value of at least one succeeding digit to be absorbed, and the digit register to be restored for reoperation, before the said group-marking digit is recorded.

5. In a digit-absorbing selector for use in an automatic switching system employing a controller common to said selector and similar other ones, a digit register and means for setting it in accordance with any value of a called digit, individualizing means and means for operating it responsive to any setting of the digit register for temporarily individualizing the controller with said selector, means responsive to the setting of the digit register in accordance with any one of a number of predetermined digit values for transferring an indication of the called digit value to the individualized controller, and means responsive to the setting of the digit register in accordance with any other digit value for terminating the said individualization without transferring an indication of the called digit value to the controller and for restoring the digit register in preparation for its reoperation in accordance with the value of any succeeding digit.

6. In a digit-absorbing selector according to claim 5, output wires for the respective settings of the digit register, first and second input wires, means including the digit register for connecting a plurality of output wires to the first input wire and for connecting the remainder of the output wires to the second input wire, the said means for operating the individualizing means including means for energizing the first input wire and connected output wires, means responsive to the operation of the individualizing means for energizing the second input wire and connected output wires, unlocking means and means for assigning the output wires connected to the first input wire thereto, means responsive to the energization of the said first input wire for operating the unlocking means, and means responsive to the operation thereof for disabling the first input wire energizing means and for connecting the first input wire to the second input wire, thereby rendering the energization of all of said output wires subject to operation of the individualizing means.

7. In a digit-absorbing selector for selectively marking trunk groups corresponding to respective call-numbers, a digit register and means for setting it in accordance with the value of any called digit in a call-number, the selector including means for restoring the digit register for reoperation to permit it to be reset in accordance with the value of each of a number of successive digits in a call-number, the digit register having output wires corresponding respectively to digit values, trunk-group marking conductors for respective trunk groups, a digit-absorbing conductor, wiring means for connecting a plurality of output wires to respective trunk groups marking conductors and for connecting other output wires to the digit-absorbing conductor, means responsive to the setting of the digit register in accordance with the value of any called digit in a call-number for energizing the corresponding output wire and connected conductor, means responsive to the energization of an output wire connected to a trunk-group-marking conductor for marking the corresponding trunk group, and means responsive to the energization of an output wire connected to the digit-absorbing conductor for operating the digit-register restoring means.

8. In a digit-absorbing selector according to claim 7, first and second input wires, first energizing means for the first input wire and second energizing means for the second input wire included in the said means for energizing an output wire and connected conductor, means including the digit register for connecting the first input wire to the said plurality of output wires and for connecting the second input wire to the said other output wires, means responsive to any setting of the digit register for operating the second energizing means to energize the said second input wire and its connected output wire, and means responsive to the setting of the digit register in accordance with a digit value corresponding to an output wire connected to a trunk-group-mark conductor for operating the first energizing means to energize the first input wire and its connected output wire.

9. In a digit-absorbing selector according to claim 7, first and second digit-adsorb conductors, means included in the said wiring means for connecting a portion of said other output wires to the first digit-absorb conductor and for connecting the remainder of such output wires to the second digit-absorb conductor, recording means for recording digit register operation, means responsive to the energization of an output wire connected to either of said digit-absorb conductors for operating the digit-register restoring means, and means responsive to energization of an output wire connected to the said first digit-absorb conductor for operating the recording means to record an indication of at least one operation of the digit register.

10. In a digit-absorbing selector according to claim 9, wherein the output wires have first and second branches and wherein the said means for energizing an output conductor energizes the said first branch, means controlled by the said operation of the recording means for transferring the said output conductors from their first branch to their second branch and means responsive to resetting of the digit register in accordance with the value of the next succeeding digit of the call-number for controlling the energizing means to energize the second branch of the output wire corresponding to such digit register setting.

11. In a digit-absorbing selector according to claim 9, the said means for operating the digit-register restoring means and for operating the recording means includes delay means for delaying the operation of the recording means until the said digit register is restored, thereby preventing an energized output wire connected to a digit-absorb conductor from being transferred to a trunk-group-mark conductor.

References Cited in the file of this patent

UNITED STATES PATENTS

| | | |
|---|---|---|
| 1,581,244 | Suekoff | Apr. 20, 1926 |
| 1,626,103 | Simmons | Apr. 26, 1927 |
| 2,029,018 | Cruickshank | Jan. 28, 1936 |
| 2,691,066 | Fisher | Oct. 5, 1954 |